United States Patent
St. Aubin et al.

(10) Patent No.: US 7,571,605 B2
(45) Date of Patent: Aug. 11, 2009

(54) SYNCHRONIZED SPEED SHIFTING OF MULTIPLE MOTORS

(75) Inventors: Joseph A. St. Aubin, Whapeton, ND (US); Jeret L. Hoesel, Lisbon, ND (US); Walter K. Rolf, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 233 days.

(21) Appl. No.: 11/619,544

(22) Filed: Jan. 3, 2007

(65) Prior Publication Data
US 2008/0161152 A1 Jul. 3, 2008

(51) Int. Cl.
*F16H 61/40* (2006.01)
*F15B 11/00* (2006.01)

(52) U.S. Cl. .................. 60/490; 60/484; 477/2
(58) Field of Classification Search .......... 60/484, 60/490, 491, 492; 477/2
See application file for complete search history.

(56) References Cited

U.S. PATENT DOCUMENTS

| | | | | |
|---|---|---|---|---|
| 4,402,181 A | * | 9/1983 | Acker et al. | 60/484 |
| 4,554,991 A | * | 11/1985 | Eden | 60/490 |
| 5,085,052 A | * | 2/1992 | Kawanaka et al. | 60/445 |
| 5,331,812 A | * | 7/1994 | Imai | 60/450 |
| 6,609,368 B2 | * | 8/2003 | Dvorak et al. | 60/425 |
| 6,857,494 B2 | * | 2/2005 | Kobayashi et al. | 180/243 |
| 7,290,390 B2 | * | 11/2007 | Kim | 60/484 |

* cited by examiner

*Primary Examiner*—Thomas E Lazo
(74) *Attorney, Agent, or Firm*—John D. Veldhuis-Kroeze; Westman, Champlin & Kelly, P.A.

(57) ABSTRACT

A system and method for substantially simultaneously shifting the speed of a plurality of multiple-speed motors that have shifting valves. The system and method includes substantially simultaneously applying an equal shifting force to all shifting valves, resisting shifting of all shifting valves with an equal biasing force arising from deflection of springs contained in springs chambers, and fluidly communicating all spring chambers with a common receptacle to equalize the pressure in all spring chambers.

19 Claims, 3 Drawing Sheets

SYNCHRONIZED SPEED SHIFTING OF MULTIPLE MOTORS

BACKGROUND

The present invention relates to a system and method for synchronized speed shifting of multiple motors.

SUMMARY

In one embodiment, the invention provides a system comprising: first and second motors; first and second means for shifting speed of the respective first and second motors, each means for shifting being movable between first and second positions corresponding to first and second different speeds of the motors; first and second biasing members, each biasing member positioned within a chamber and biasing one of the first and second means for shifting into the first position; means for substantially simultaneously providing an equal-strength signal to the first and second means for shifting to move the means for shifting from the first position toward the second position; and means for equalizing pressure in the chambers such that resistance to moving each means for shifting from the first position to the second position is substantially equal.

The invention may be embodied, for example, in a construction vehicle such as a skid steer loader or the like. The motors may be hydraulic motors operating under the influence of a flow of pressurized hydraulic fluid.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
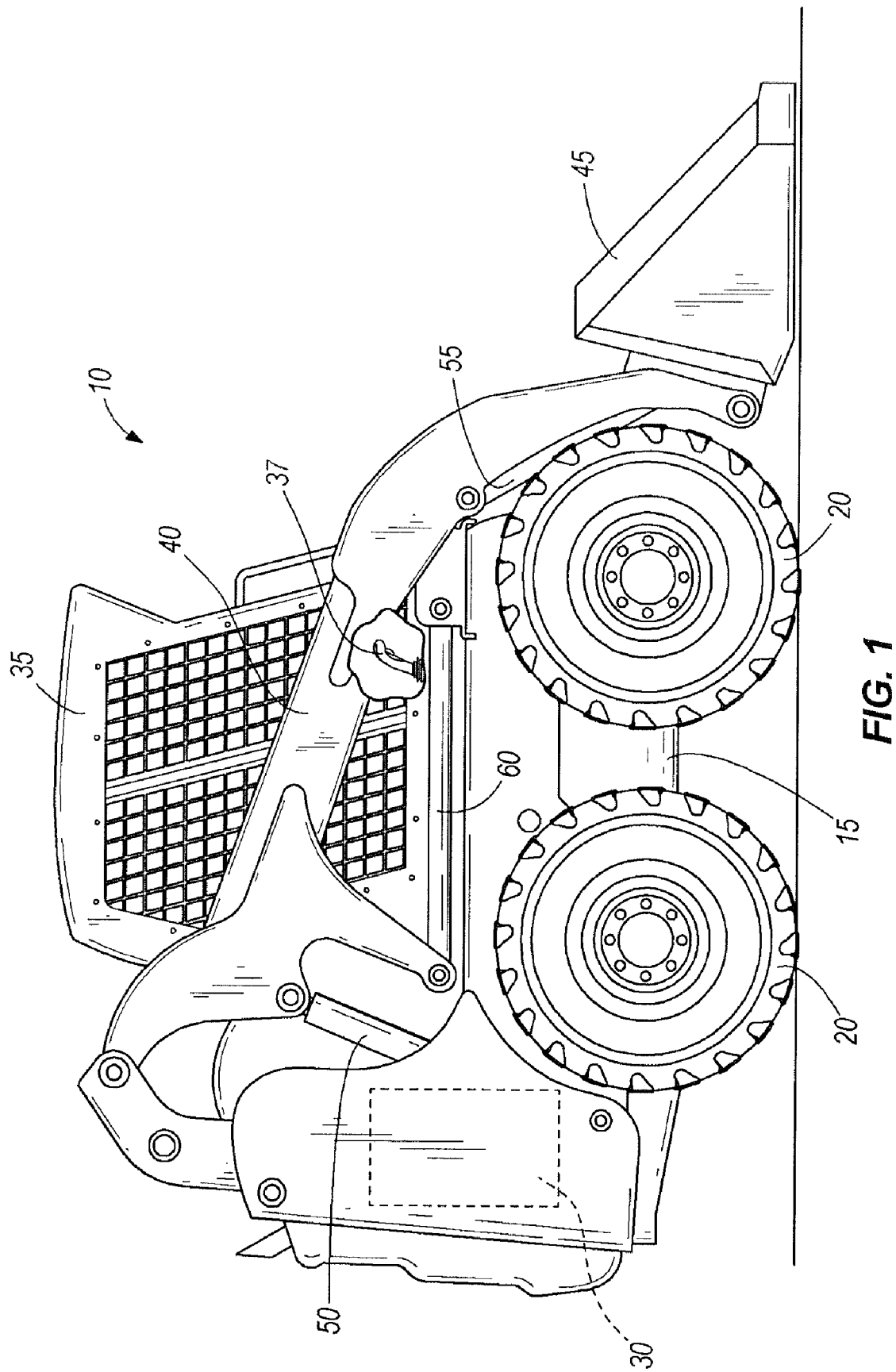
FIG. 1 illustrates a skid steer loader embodying the present invention.
Figure 2:
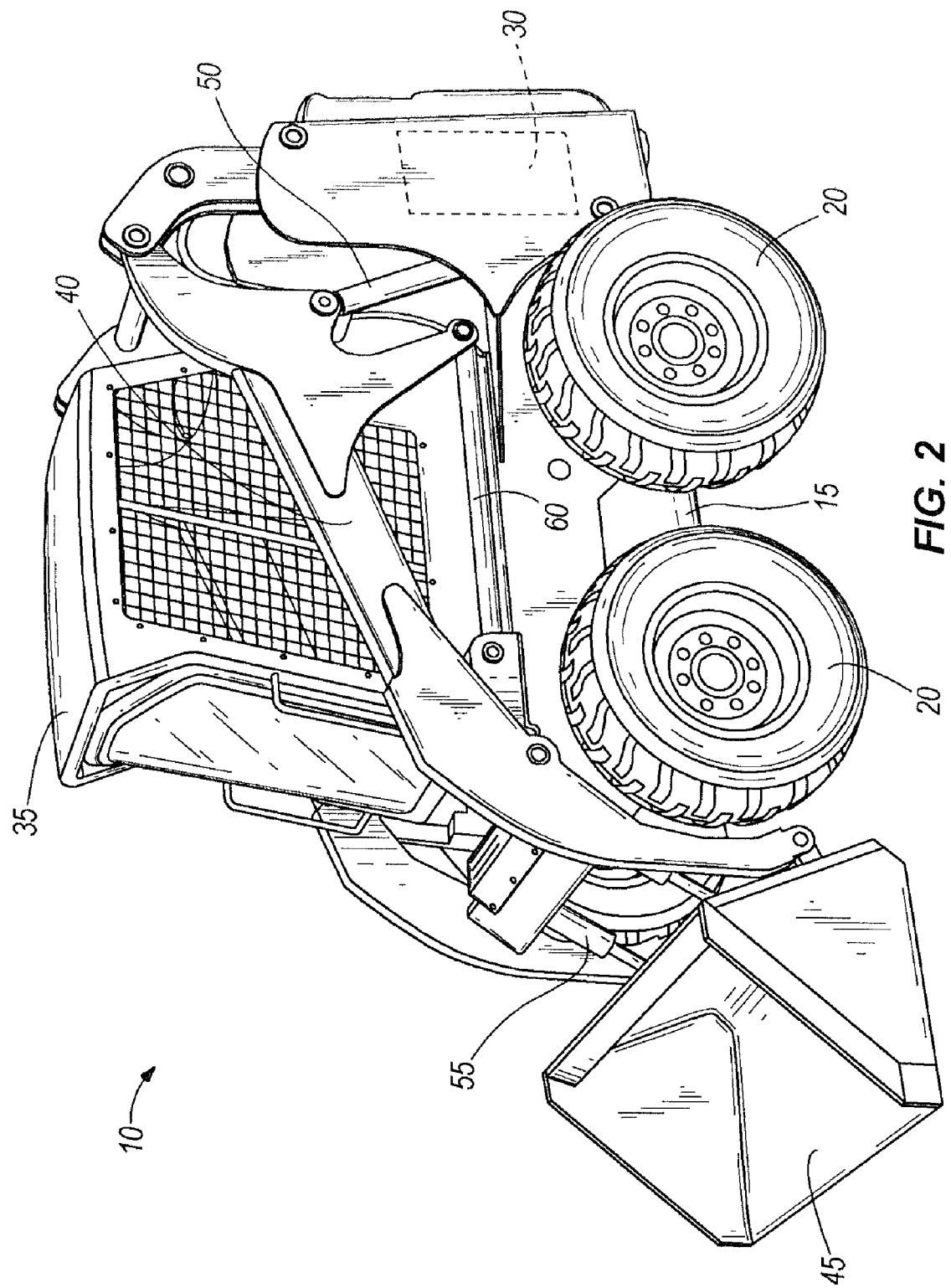
FIG. 2 illustrates another view of the skid steer loader.

FIGS. 1 and 2 depict a skid steer loader 10 having a frame 15 supported by four wheels 20, an internal combustion engine 30, an operator compartment 35 that contains an operator control 37, right and left lift arms 40, and a bucket 45 mounted for tilting between the distal ends of the lift arms 40. Although the invention is illustrated embodied in a skid steer loader 10, the invention may be embodied in other vehicles and machines. Although the illustrated operator control 37 takes the form of a joystick, in other embodiments, the control may include multiple joysticks and/or foot pedals. Although the illustrated prime mover for the vehicle is the internal combustion engine 30, other prime movers and sources of energy including but not limited to fuel cells, solar energy, batteries, and corded electric motors may be used in other embodiments.

When all four wheels 20 turn at the same speed, the loader 10 moves forward and backward, depending on the direction of rotation of the wheels 20. The loader 10 turns on a relatively large radius by rotating the right and left side wheels 20 in the same direction but at different rates, and rotates about a substantially zero turn radius by rotating the right and left side wheels 20 in opposite directions.

The lift arms 40 raise (i.e., rotate counterclockwise in FIG. 1) and lower (i.e., rotate clockwise in FIG. 1) with respect to the frame 15 under the influence of lift cylinders 50 mounted between the frame 15 and the lift arms 40. The bucket 45 tilts with respect to the arms 40 to curl (i.e., rotate counter-clockwise in FIG. 1) and dump (i.e., rotate clockwise in FIG. 1) under the influence of tilt cylinders 55 mounted between the lift arms 40 and the bucket 45. Support links 60 are pivotably mounted between the frame 15 and each lift arm 40 to provide additional support and stability to the lift arms 40. Various auxiliary implements or devices may be substituted for or used in conjunction with the bucket 45. An example, but by no means exhaustive, list of auxiliary implements includes augers, jack hammers, trenchers, grapples, rotary sweepers, stump grinders, saws, concrete mixers, pumps, chippers, snow throwers, rotary cutters, and backhoes.

Figure 3:
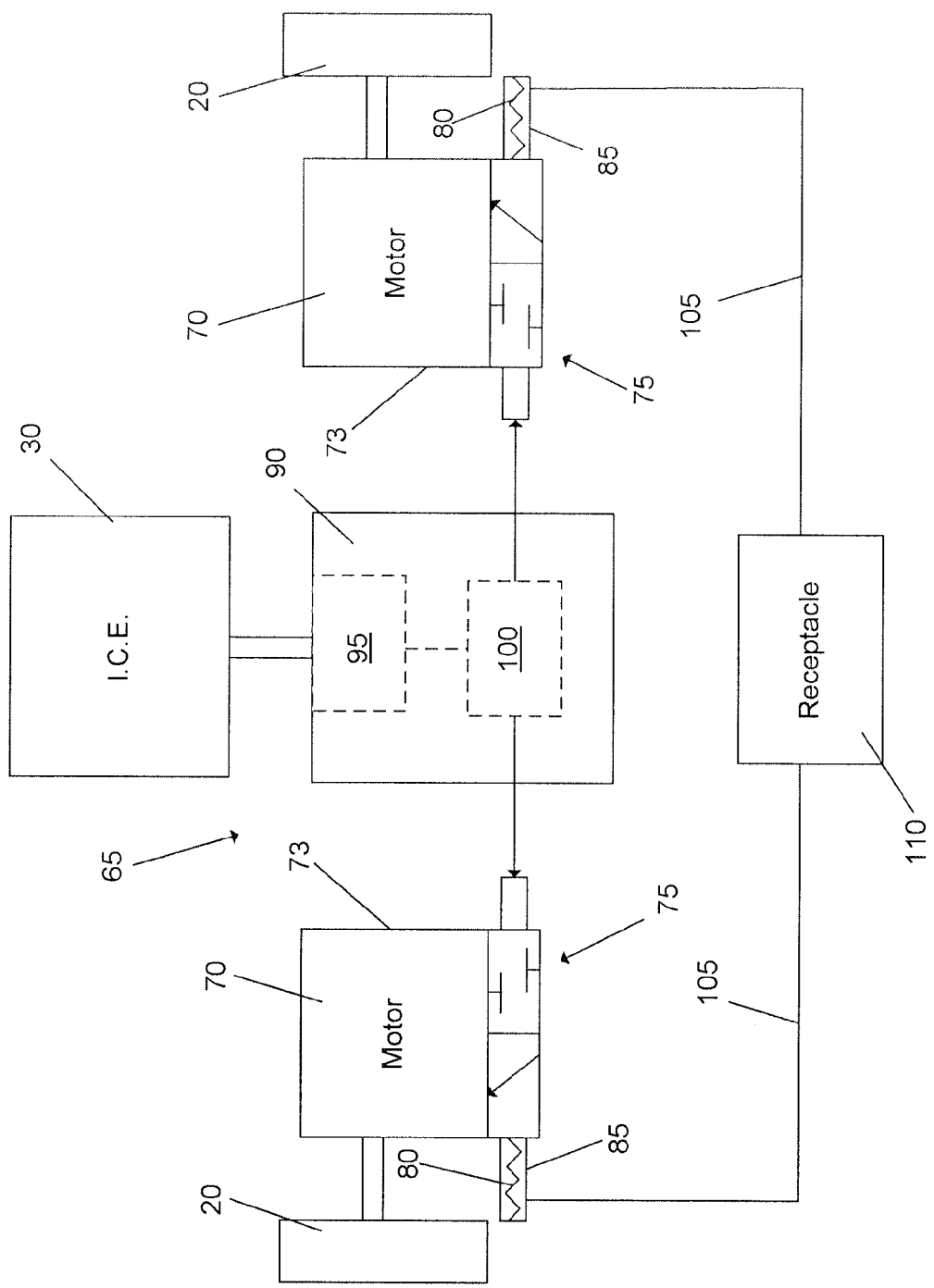
FIG. 3 is a schematic illustration of a portion of a hydraulic circuit of the skid steer loader.

FIG. 3 is a schematic illustration of a portion of a hydraulic circuit 65 of the skid steer loader 10. Depending on how the hydraulic system 65 is configured, the front and/or rear wheels 20 may be independently rotated by the dedicated hydraulic motors 70. Each motor 70 has a motor housing 73. For the sake of illustration, FIG. 3 shows only two of the wheels 20 (i.e., the right and left front or rear wheels) being driven by dedicated motors 70, in which case the other two wheels would passively rotate as the skid steer loader 10 moves over ground. In a preferred commercial embodiment, the skid steer loader 10 includes four dedicated motors 70 to independently drive the four wheels 20.

The speed of each motor 70, and therefore the speed of rotation of the associated wheel 20, is controlled by a two-speed shifting valve 75 that is slidable to increase or decrease the displacement of the motor 70. When the shifting valve 75 decreases the motor's displacement, it causes the motor 70 to operate (and the associated wheel 20 to rotate) at a faster speed, and when it increases the motor's displacement, it causes the motor 70 to operate (and the associated wheel 20 to rotate) at a slower speed. Each shifting valve 75 is biased toward the high displacement, low speed position by a spring 80 in a spring chamber or housing 85.

The hydraulic system 65 provides a source of pressurized hydraulic fluid 90, which may in some embodiments include one or more hydraulic pumps 95 that are driven by the internal combustion engine 30 (or other prime mover, as may be the case for particular applications), and a control cartridge 100. Although the present invention is described as using the illustrated hydraulic system 65, other embodiments may use motive fluids (e.g., pneumatic or other pressurized fluids) other than hydraulic fluid. The control cartridge 100 communicates between the hydraulic pump 95 and the shifting valves 75, to simultaneously control exposure of both shifting valves 75 to the pressurized hydraulic fluid. When the control cartridge 100 exposes the shifting valves 75 to the pressurized hydraulic fluid or motive pressure, the motive pressure shifts the shifting valves 75 from their high displacement (low speed) positions to their low displacement (high speed) positions. In some embodiments, the cartridge 100 is of the modulated variety, which permits the pressure applied to the shifting valves 75 to ramp up at a rate that causes the motors 70 to shift from low speed to high speed at a relatively slow, controlled rate to increase the operator's comfort while transitioning from low speed to high speed. For example, a modulated cartridge may increase pressure on the shifting spool from 0 psi to 200 psi over about a two second period of time, as opposed to a substantially instantaneous time period (e.g., milliseconds) that might result from use of an unmodulated cartridge.

In many known systems, hydraulic fluid leaks into the spring chambers 85 and is drained into the motor housing 73 of the motor 70 associated with the spring chamber 85. The spring chambers 85 of such known systems are therefore exposed to the pressure within the associated motor housing 73. One motor housing 73 will in many instances have an internal pressure different from the other motor housing 73 within the system, due to different operating modes and conditions of the motors 70. Therefore, despite the cartridge 100 providing an identical, synchronized pressure signal to the shifting valves 75, the shifting valve 75 having a lower back-pressure in its associated spring chamber 85 will shift more quickly than the other shifting valve 75, which results in the associated motors 70 shifting between speeds at different times. During the lag between both motors 70 being at the first speed and both motors 70 achieving the second speed, the wheels 70 are driven at different speeds, which results in the vehicle drifting off its line of travel as the speed is shifted.

To better synchronize actuation of the shifting valves 75, the present invention includes reference conduits 105 that communicate between the spring chambers 85 and a common receptacle 110, such that both spring chambers 85 are exposed to the same pressure (i.e., the pressure within the receptacle 110). For the purposes of describing this invention, the term "receptacle" includes open and closed containers and reservoirs, as well as the atmosphere. The reference conduits 105 may, for example, include orifices, apertures, hoses, tubes or pipes that communicate between the spring chambers 85 and a hydraulic return tank or reservoir having a substantially atmospheric pressure, or some other receptacle having an elevated pressure (less than the motive pressure). The reference conduits 105 bypass the motor housings 73 of the respective motors 70 to which the spring chambers 85 are associated, so that the spring chambers 85 are not exposed to the inconsistent pressures within those motor housings 73.

Existing systems may be retrofitted to practice the present invention by plugging the hole or conduit communicating between each spring chamber 85 and the associated motor housing 73, and installing reference conduits 105 to place each spring chamber 85 in communication with a common receptacle 110. One of the motor housings 73 may be used as the common receptacle 10 by placing all spring chambers 85 in communication with a single motor housing 73. This could be done by blocking communication between all spring chambers 85 except one and their associated motor housings 73, and placing those spring chambers 85 in communication with the unblocked motor housing 73 by way of reference conduits 105.

Hydraulic fluid that has leaked into the respective spring chambers 85 drains to the receptacle 110 through the reference conduits 105 and is forced through the conduits 105 as the shifting valves 75 are shifted and the volume of the spring chamber 85 is decreased. The conduits 105 have sufficient cross-sectional size to not restrict the flow of fluid out of the spring chambers 85 and into the receptacle 110. The back-pressure within the spring chambers 85 is about equal to the receptacle pressure 110, regardless of the relative amount of hydraulic fluid that has leaked into one spring chamber 85 compared to the other. Deflection of both shifting valves 75 is resisted by a force that is a function of the biasing force of the springs 80 (the springs 80 having substantially identical spring constants and preloads) and the internal pressure of the receptacle 110. Such resistance may be, for example and without limitation, proportional to the biasing force of the springs 80 and the internal pressure of the receptacle 110.

Although the present invention has been described and illustrated with reference to a skid steer loader 10 application, it is capable of being embodied in many different applications which seek to synchronize speed shifting of two or more multiple-speed motors. For example, the illustrated and described skid steer loader 10 may be modified to include a motor and shifting valve for each of the four wheels 20, in which case the spring chambers 85 of all four shifting valves 75 would be reference to the common receptacle 110 through reference conduits 105. Other embodiments may include vehicles other than skid steer loaders that rely on multiple-speed motors to drive two or more of the vehicle's wheels, and a skid steer loader is but one example of a vehicle in which the invention may be embodied. The vehicle need not have wheels, as in the case of a compact track vehicle. In this regard, the term "rotatable members" may be used to broadly encompass wheels, tracks, propellers, fans, paddles, or any other implement that rotates to control the speed and direction of vehicle travel.

Also, the invention is not limited to coordinating or synchronizing the speed shifting of two-speed motors, and can be used when coordinating or synchronizing the speed shifting of motors having three or more speeds as well. In a broader sense, the invention may be embodied in applications other than vehicles, provided the application includes a plurality of multiple-speed motors that are desired to be speed shifted in a substantially simultaneous, synchronize manner.

Thus, the invention provides, among other things, a system and method for synchronized speed shifting of multiple motors. Various features and advantages of the invention are set forth in the following claims.

What is claimed is:

1. A system comprising:
   first and second motors;
   first and second shifting spools operationally coupled to the first and second motors and movable between first and second positions to change a displacement of the first and second motors;
   first and second biasing members, each biasing member positioned within respective first and second chambers and the first biasing member biasing the first shifting spool in the first position and the second biasing member biasing the second shifting spool in the first position;
   an actuator assembly configured to supply a force or pressure to the first and second shifting spools to move the first and second shifting spools against the first and second biasing members to shift from the first position toward the second position; and
   a pressure equalizing assembly including a common receptacle in fluid communication with the first and second chambers to equalize resistance for moving the first and second shifting spools from the first position to the second position.

2. The system of claim 1 wherein the actuator assembly comprises a source of pressurized fluid and a cartridge assembly adapted to simultaneously supply the pressurized fluid to move the first and second shifting spools against the first and second biasing members.

3. The system of claim 2, wherein the actuator assembly includes a modulator to modulate the supply of the pressurized fluid to the first and second shifting spools.

4. The system of claim 1 wherein the pressure equalizing assembly includes first and second conduits wherein the first conduit is in fluid communication with the first chamber and the receptacle and the second conduit is in fluid communication with the second chamber and the receptacle.

5. The system of claim 1 and comprising a first rotatable member coupled to the first motor and a second rotatable member coupled to the second motor.

6. The system of claim 5 wherein the first and second rotatable members are connected to a construction vehicle.

7. The system of claim 5 wherein the first and second rotatable members comprise at least one of a rotating wheel assembly or track assembly.

8. The system of claim 1 wherein the first and second biasing members comprise first and second springs operable in the first and second chambers.

9. The system of claim 1 wherein the first and second motors are hydraulic motors and the first and second shifting spools actuate the first and second hydraulic motors between at least two speeds.

10. The system of claim 1 wherein the actuator assembly comprises a pressurized fluid supplied by a pump and a control cartridge operable to supply the pressurized fluid from the pump to the first and second shifting spools to move the first and second shifting spools from the first position to the second position.

11. The system of claim 10 wherein the pressurized fluid is a hydraulic fluid.

12. The system of claim 1 wherein the first and second shifting spools are operable between an opened position and a restricted position to change the displacement of the first and second motors.

13. The system of claim 12 wherein the shifting spools are biased in the opened position and are shifted to the restricted position to reduce the displacement and increase motor speed of the first and second motors.

14. A construction vehicle comprising:
a frame;
a plurality of rotatable members rotatably mounted with respect to the frame and rotatable to control a speed and direction of vehicle travel;
a prime mover supported by the frame;
a source of pressurized fluid driven by the prime mover to create a flow of pressurized fluid;
a plurality of motors interconnected to an associated rotatable member to drive rotation of the associated rotatable member;
a speed shifting valve associated with each motor and movable between first and second positions corresponding to first and second different speeds of the associated motor;
a biasing member in a chamber associated with each speed shifting valve, each biasing member biasing the associated speed shifting valve into the first position;
a mechanism for substantially simultaneously exposing all of the speed shifting valves to the pressurized fluid;
a receptacle having an internal pressure; and
a plurality of reference conduits placing the chambers in fluid communication with the receptacle such that pressure within each chamber is substantially equal to the internal pressure of the receptacle.

15. The vehicle of claim 14, wherein the rotatable members include wheels; wherein the prime mover includes an internal combustion engine; and wherein the source of pressurized fluid includes a hydraulic pump driven by the internal combustion engine.

16. The vehicle of claim 15, further comprising a lift arm, an auxiliary implement supported by the lift arm, a lift cylinder for raising the lift arm with respect to the frame, and a tilt cylinder for pivoting the implement with respect to the lift arm, wherein the hydraulic pump provides pressurized fluid to the lift and tilt cylinders.

17. The system of claim 14 wherein the speed shifting valve associated with each motor comprises a spool operable between an opened position and a restricted position to change a displacement of each of the plurality of motors.

18. The system of claim 17 wherein the spool is biased in the opened position and is moved to the restricted position to reduce the displacement of each of the plurality of motors and increase the speed of each of the plurality of motors.

19. A method for synchronizing speed shifting of a plurality of motors, the motors including speed shifting valves shiftable under the influence of a motive pressure, and biasing members in chambers biasing the speed shifting valves into a first position corresponding to a first motor speed, the method comprising the steps of:
(a) fluidly communicating all chambers with a single receptacle having an internal pressure;
(b) substantially simultaneously applying an equal shifting force to each of the speed shifting valves to move the speed shifting valves into a second position corresponding to a second motor speed different from the first; and
(c) resisting shifting of each speed shifting valve with a substantially equal force that is a function of the biasing force and the internal pressure of the receptacle.

* * * * *